(12) United States Patent
Savage et al.

(10) Patent No.: US 6,255,754 B1
(45) Date of Patent: Jul. 3, 2001

(54) FLUX DAMPER FOR PERMANENT MAGNET ELECTRIC MOTORS

(75) Inventors: Jack Winfield Savage, Centerville; John Riden Suriano, Kettering, both of OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 463 days.

(21) Appl. No.: 08/577,839

(22) Filed: Dec. 22, 1995

(51) Int. Cl.[7] .................................................... H02K 3/18
(52) U.S. Cl. ............................................. 310/183; 310/51
(58) Field of Search ................................... 310/186, 183, 310/191, 209, 13, 192

(56) References Cited

U.S. PATENT DOCUMENTS

| | | | |
|---|---|---|---|
| 3,566,251 | 2/1971 | Hoglund | 322/46 |
| 3,663,851 | * 5/1972 | Persson | 310/154 |
| 3,686,524 | 8/1972 | Hall | 310/154 |
| 3,793,546 | * 2/1974 | King, Jr. | 310/183 |
| 3,929,390 | * 12/1975 | Simpson | 310/93 |
| 4,024,458 | * 5/1977 | Templin | 331/133 |
| 4,329,609 | * 5/1982 | Allegre et al. | 310/183 |
| 5,000,524 | 3/1991 | Savage | 303/115 |
| 5,130,591 | * 7/1992 | Sato | 310/172 |
| 5,177,383 | * 1/1993 | Sim | 310/13 |
| 5,219,214 | 6/1993 | Savage et al. | 303/115.2 |

OTHER PUBLICATIONS

"Theory of Alternating–Current Machinery," by Alexander S. Langsdorf, Second Edition, McGraw Hill, 1955; pp. 203–204.

"Control of Mechanical Vibrations in DC Machines," by A. Foggia, et al., 1990 IEEE Industry Applications Society Annual Meeting, Seattle, WA, pp. 99–101.

"Flux Augmentation of Permanent Magnet Direct Current Machines," by Donald F. Harker IV, M.S. Thesis, University of Missouri–Rolla, 1991.

* cited by examiner

Primary Examiner—Tran Nguyen
(74) Attorney, Agent, or Firm—Jacox, Meckstroth & Jenkins (57) ABSTRACT

In an electric motor, a conductive ring surrounds, and shields, each pole of stationary magnet. When a changing magnetic flux, produced by an armature, penetrates the ring, by Lenz's Law, the changing flux causes the ring to produce a counter-flux, which adds to the changing flux. Consequently, the total flux within the ring tends to remain constant. Maintaining this constant flux tends to reduce noise and vibration which the changing rotor flux otherwise causes.

14 Claims, 12 Drawing Sheets

SAMPLE 0.5ms

FIG-11

SAMPLE 0.5ms

FIG-13

FLUX DAMPER FOR PERMANENT MAGNET ELECTRIC MOTORS

The invention concerns damping of changes in magnetic flux which occur in electric motors, thereby damping noise and vibration which the flux changes induce.

BACKGROUND OF THE INVENTION

FIGS. 1–5 provide simplified illustration of some events which occur in electric motors, and give some possible explanations of vibration and noise.

Figure 1A:
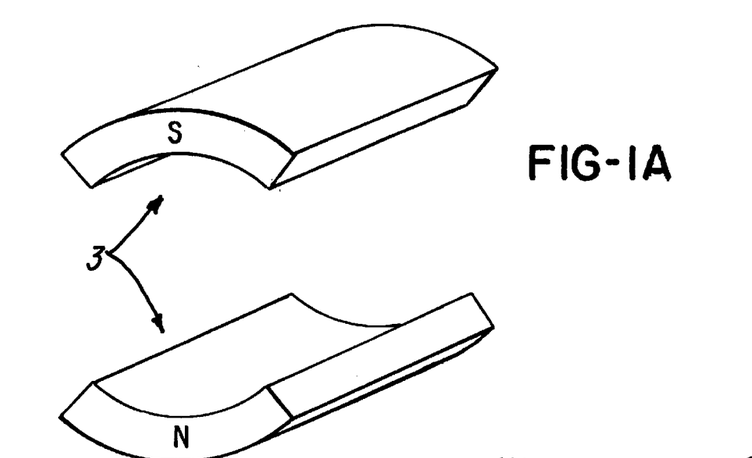
FIGS. 1A–1C illustrate exploded views of a simplified DC machine.
Figure 1B:
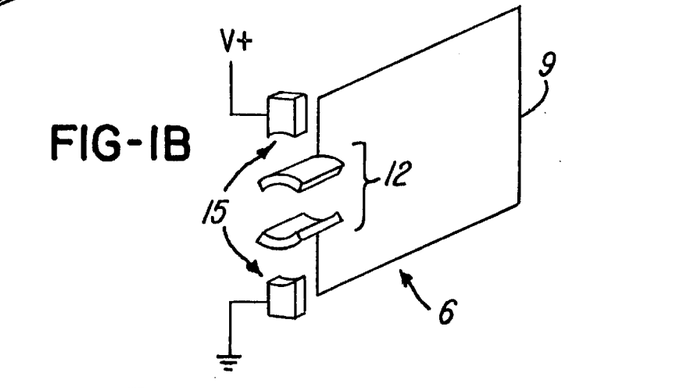
Figure 1C:
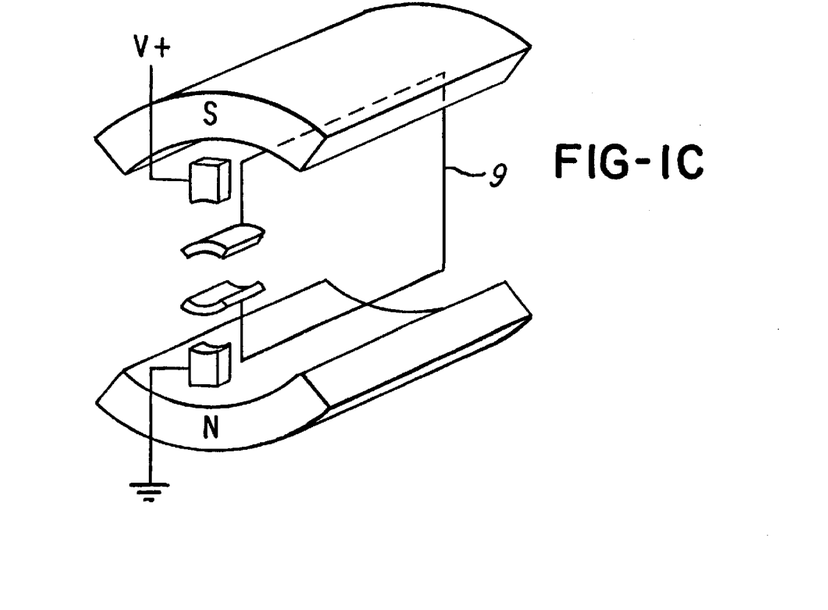

FIG. 1A illustrates permanent magnets 3, having poles north N and south S, as contained within a permanent magnet electric motor (motor is not shown). FIG. 1B illustrates an armature 6, which includes a single-turn coil 9 and a commutator 12. In operation, brushes 15 contact the commutator 12. FIG. 1C illustrates the components of FIGS. 1A and 1B when assembled.

Figures 2A, 2B:
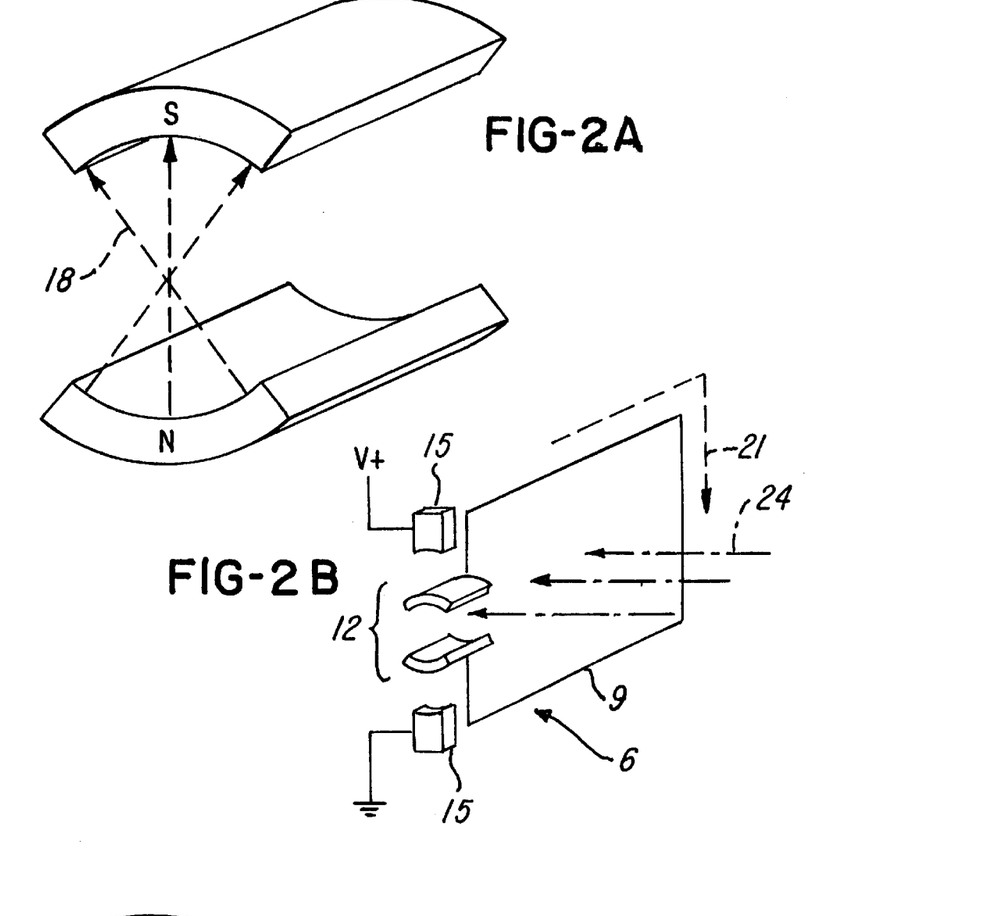
FIGS. 2A–2C illustrate the components of FIG. 1, in greater detail.
Figure 2C:
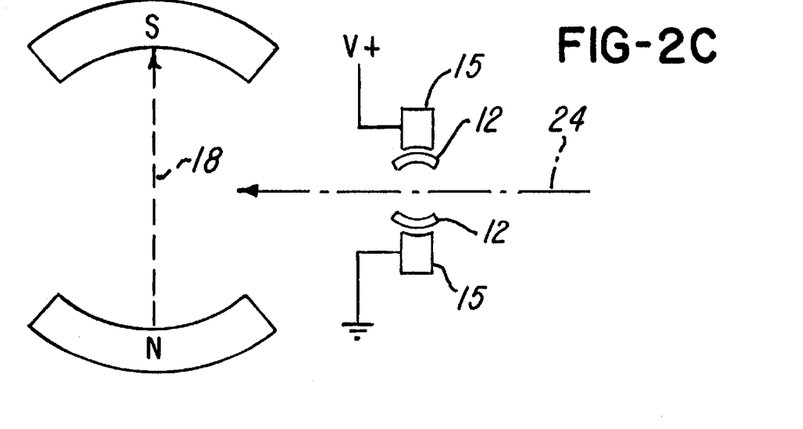

FIG. 2A illustrates magnetic field lines 18 produced by the magnets 3 of FIG. 1A. FIG. 2B illustrates current 21 induced by voltage V+ applied to the brushes 15, and also the magnetic flux lines 24 which accompany the current 21. FIG. 2C is a cross-sectional view of FIGS. 2A and 2B, with some of the flux lines 24 removed, and with the brushes 15 shown in contact with the commutator 12.

Figure 3A:
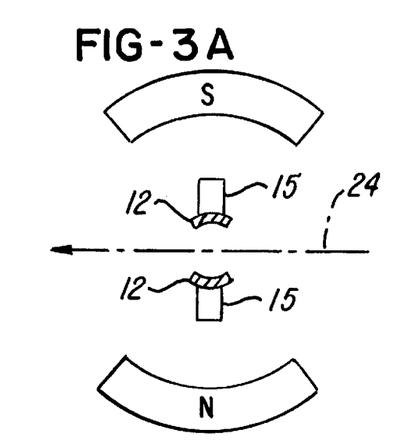
FIGS. 3A–3F illustrate rotation of magnetic flux line 24, caused by rotation of coil 9 of FIG. 1B

FIGS. 3A through 3F show the components of FIG. 2C in assembled form, and show how the magnetic flux 24, produced by the armature 6, rotates as the armature 6 rotates. In FIG. 3A, the flux 24 is directed to the left, and does not cross the south pole S. (In actual practice, some leakage flux may cross the south pole, but FIG. 3A is a simplification, used to illustrate major principles.)

Figure 3B:
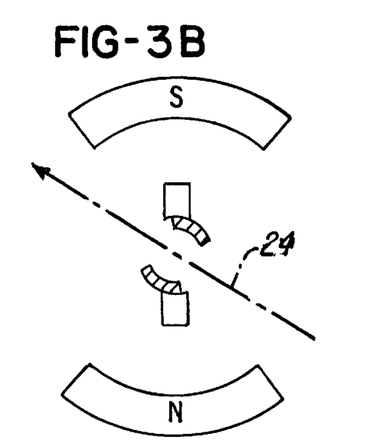
Figure 3C:
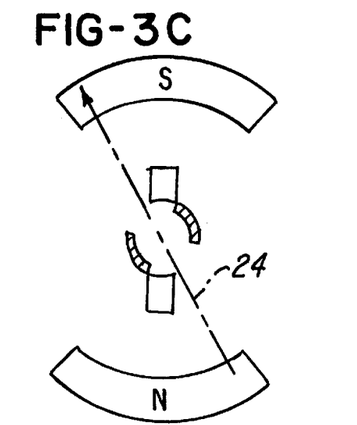

In FIG. 3B, the armature 6 has rotated clockwise, and the armature's flux 24 occupies the position shown. In FIG. 3C, the armature flux 24 penetrates the south pole S.

Figure 3D:
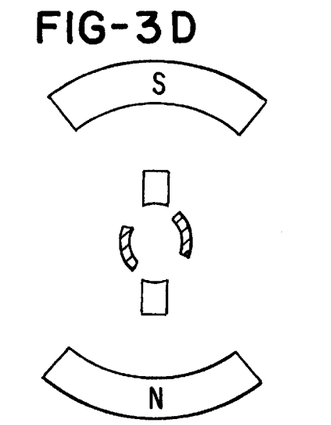
Figure 3E:
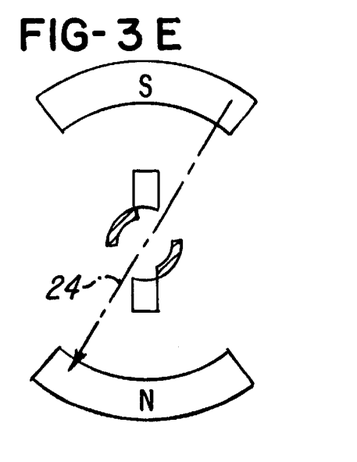
Figure 3F:
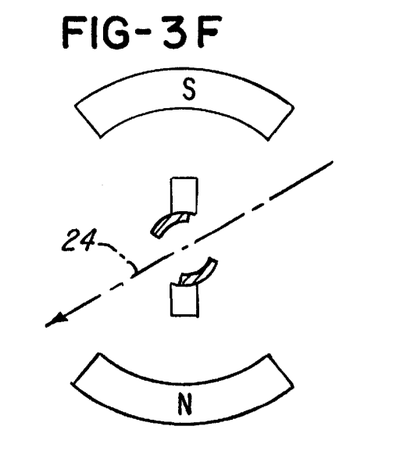

In FIG. 3D, the armature flux 24 has disappeared, because the commutator 12 is no longer in contact with the brushes 15. In FIG. 3E, the armature flux 24 has re-appeared, because the commutator re-contacts the brushes 15. However, the flux 24 has reversed in direction, as indicated by a comparison of FIG. 3E with FIG. 3C. FIG. 3F indicates the position of the armature flux 24 a time later than in FIG. 3E, wherein the flux does not penetrate the north pole N.

The sequence of FIG. 3 provides a simple explanation of one cause of vibration. The sequence of FIGS. 3B through 3F show the following events:

| Figure | Event |
|---|---|
| 3B | No penetration of south pole. |
| 3C | Penetration. |
| 3D | No penetration. |
| 3E | Penetration, but reversed in direction. |
| 3F | No penetration. |

The sequence can be characterized as a repeated sequence of two events: flux penetration of the south pole S, followed by removal of penetration.

In effect, a magnetic field is repeatedly applied, and then removed, from the south pole S. The application of the magnetic field applies a force to the south pole S. The removal of the magnetic field removes the force. The sequence of ... force ... no force ... force ... no force is believed to cause vibration of the south pole S. Similar events occur with respect to the north pole N.

Figure 4A:
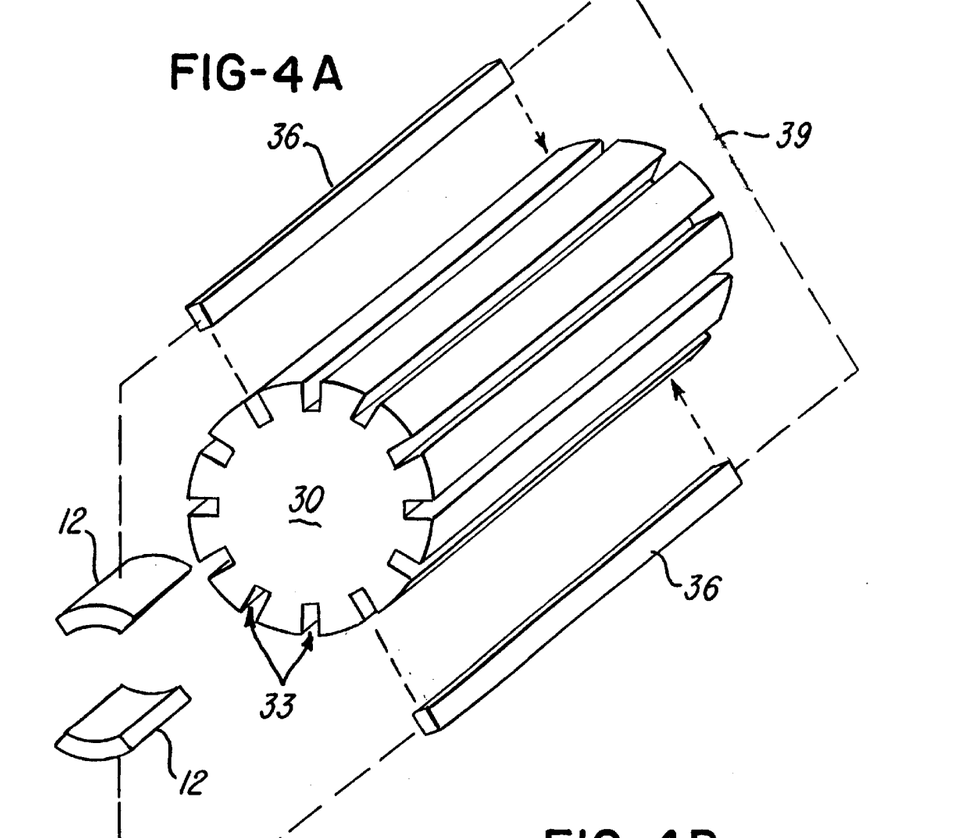
FIG. 4A is an exploded view of a slotted rotor.

A second cause of vibration can be explained with reference to FIGS. 4 and 5. In FIG. 4A, an actual armature 6 comprises a rotor 30 containing slots 33, which hold conductive bars 36 (also called armature windings). Additional conductors, indicated by the dashed lines 39, form a conductive loop, analogous to loop 9 in FIG. 1B.

Figure 4B:
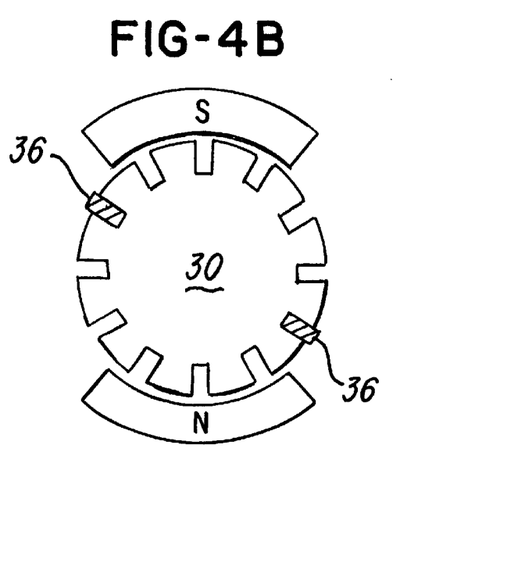
FIG. 4B is a cross-sectional view of a slotted rotor contained between two magnets.

FIG. 4B shows the slotted rotor 30 in cross section, and includes the conductive bars 36. When current passes through the loop comprising bars 36 and dashed lines 39 in FIG. 4A, the flux lines 40 shown in FIG. 5A are generated. Two positions which the slotted rotor occupies during rotation are shown in FIGS. 5B and 5C.

A significant feature of these two positions is that the flux lines must traverse different numbers of slots en route to the south pole S. That is, different flux lines follow paths through different materials. Consequently, different flux lines apply different forces to the south pole S. These differences can also cause vibration, as will now be explained.

Figure 5A:
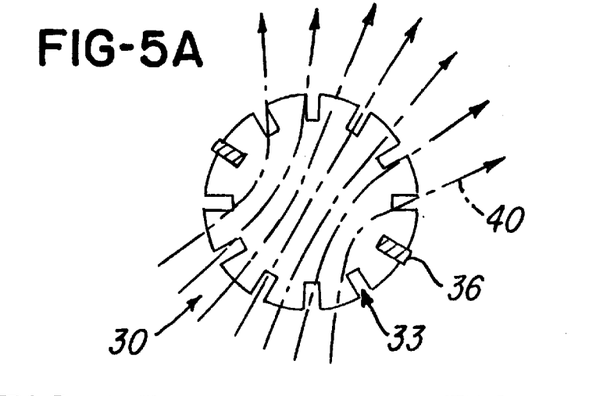
FIGS. 5A–5C illustrate how the air gap effectively changes between a rotor and stator, during rotation of the rotor.

The slots 33 in FIG. 5A act as an air gap, and reduce the strength of the flux lines 40. (Even though the slots 33 contain the conductive bars 36, the slots can be viewed, for present purposes, as being filled with air, because the magnetic permeability of the conductive bars is close to that of air, when compared with the permeability of the material of which the rotor 30 is itself constructed.

How an air-gap can change a magnetic field can be explained by an analogy. When a hand-held magnet is brought two inches from a steel nail, the nail hardly "feels" the magnet, because of the large, two-inch, air gap. However, when the magnet is brought sufficiently close to the nail, the nail snaps into contact with the magnet. The very small air gap, created when the magnet approached the nail, caused the strength of the flux lines (more precisely, the magnetic flux density) to increase.

Figure 5B:
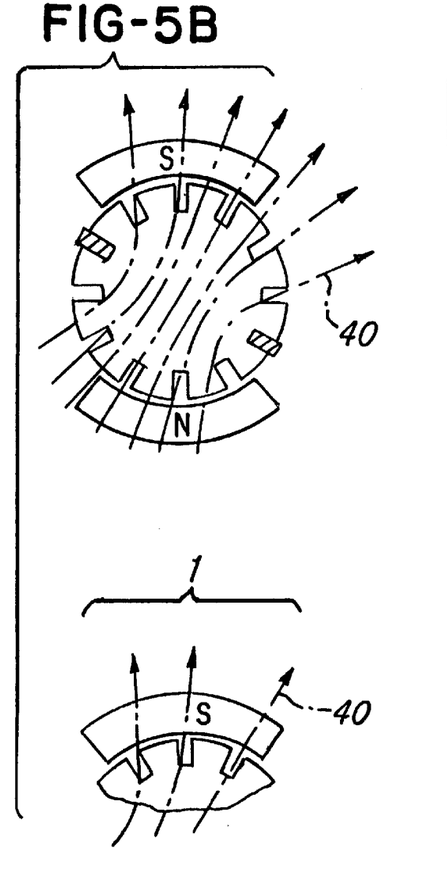

Similarly, when the rotor 30 is in the position shown in FIG. 5B, the flux lines must pass through three slots, or air gaps, indicated in insert I, en route to the south pole S. In contrast, in FIG. 5C, the number of slots increases from three to four, as indicated in insert I2.

Figure 5C:
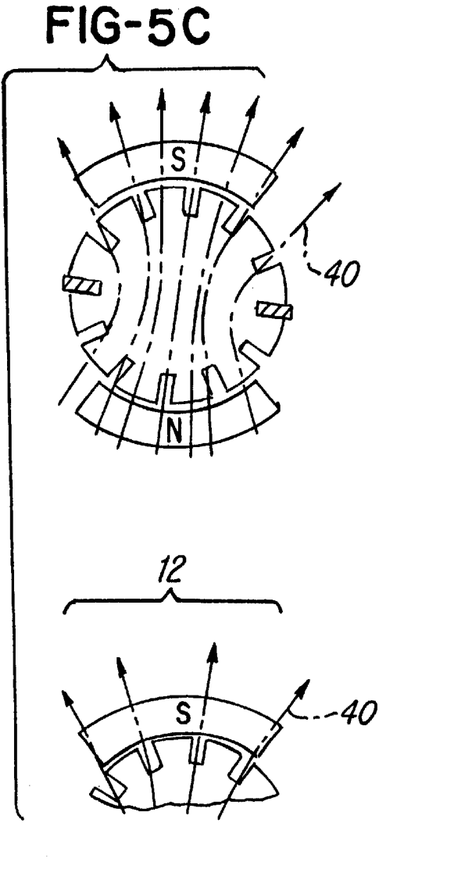

In effect, the air gap between the armature and the south pole S has increased from FIG. 5B to FIG. 5C. Consequently, the "pull" which the rotor 30 applies to the south pole S, because of the flux lines 40, decreases in FIG. C, compared with FIG. 5B, because of the increased air gap, similar to the case of the steel nail.

Therefore, as the armature 30 rotates, the number of slots, through which the flux lines must travel en route to the south pole S, changes, thereby changing the magnetic force applied to the south pole S. This changing magnetic force induces vibration. Some components of the vibration lie within the range of human hearing, and are perceived as audible noise.

A similar analysis applies to the north pole N.

SUMMARY OF THE INVENTION

An object of the invention is to reduce noise and vibration in electric motors.

A further object of the invention is to reduce noise and vibration caused by a changing magnetic flux applied to internal components of a permanent magnet electric motor.

In one form of the invention, a conductive ring surrounds a stationary pole of a magnet in an electric motor. When armature flux through the hole in the ring changes, a current is induced, which generates a magnetic field which compensates for the change in the armature flux, thereby tending to keep the overall flux constant.

DETAILED DESCRIPTION OF THE INVENTION

Figure 6:
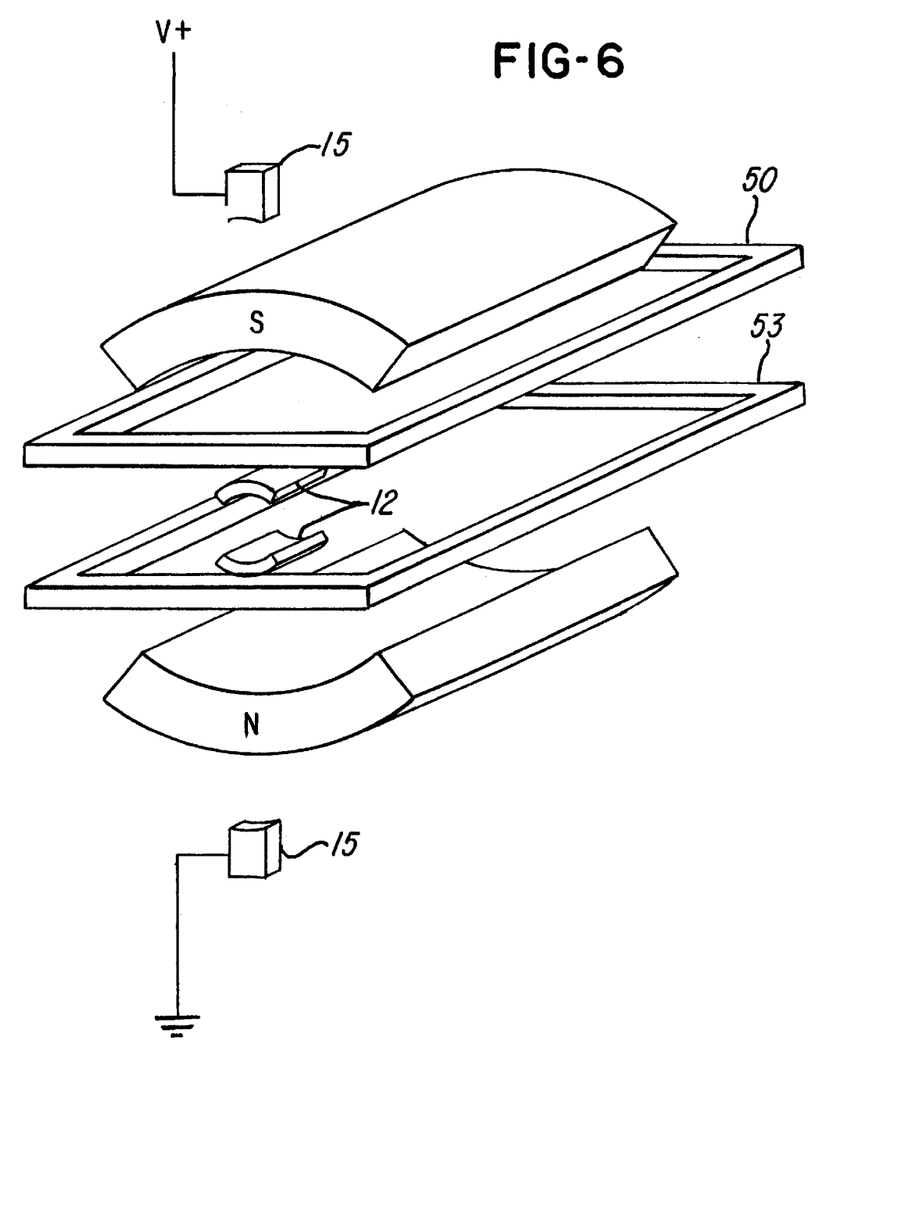
FIG. 6 illustrates one form of the invention.

FIG. 6 illustrates an electric motor comprising one form of the invention. For ease of illustration, no armature coils are shown. In this embodiment, the electric motor comprises two stationary conductive loops 50 and 53. The loop 50 interacts primarily with the flux penetrating the south pole S, and the other loop 53 interacts primarily with the flux penetrating the south pole S.

FIG. 7 provides a simplified explanation of he operation of loop 50. In FIG. 7A, loop 9, shown also in FIG. 1B, produces magnetic flux lines 59. In the sequence of FIGS. 7B through 7E, the loop 9 is shown rotating about motor axis 61. The flux lines 59 rotate also, as indicated.

Figure 7A:
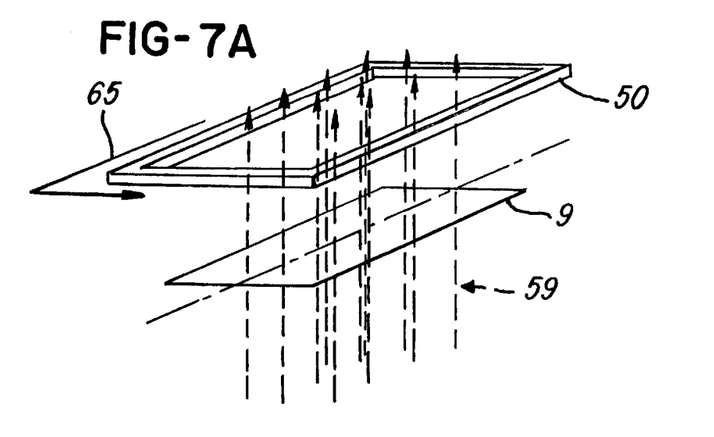
FIGS. 7A–7E illustrate rotation of magnetic flux lines 59, with respect to ring 50 of FIG. 6.
Figure 7B:
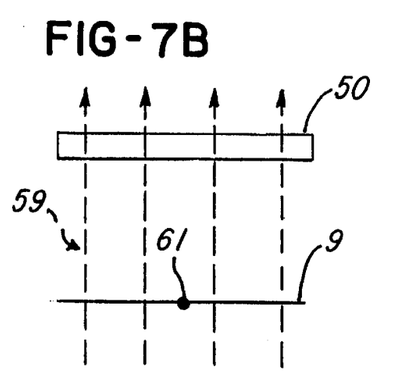

During the rotation, the flux, which the ring 50 in FIG. 7A surrounds, changes, as indicated by FIGS. 7B through 7E. This change induces a current 65 in FIG. 7A. By Lenz's Law, this current produces its own flux (not shown) which compensates for the changing flux, thereby tending to keep the overall flux passing through the ring 50 constant.

Figure 7C:
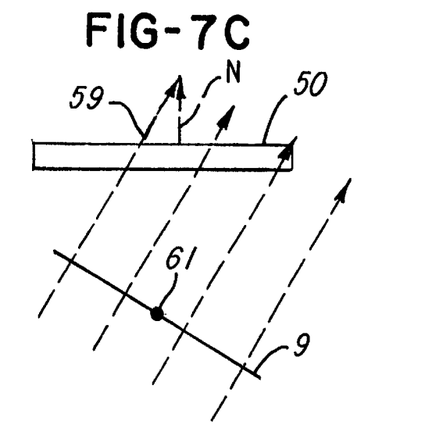
Figure 7D:
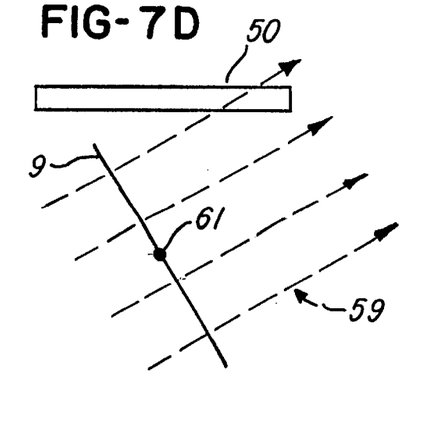
Figure 7E:
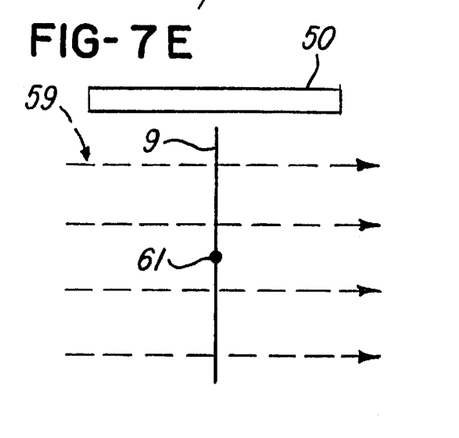

More specifically, a voltage is induced in the ring, which is proportional to the first time-derivative of the normal (i.e., perpendicular) component of the flux passing through the ring. This voltage induces the current 65 in FIG. 7A. One normal component N is shown in FIG. 7C. Normalcy, or perpendicularity, is defined with reference to the plane of the ring 50.

Therefore, the ring 50 in FIG. 6 shields the south pole S from the changes in flux discussed in the Background of the Invention.

Figure 8:
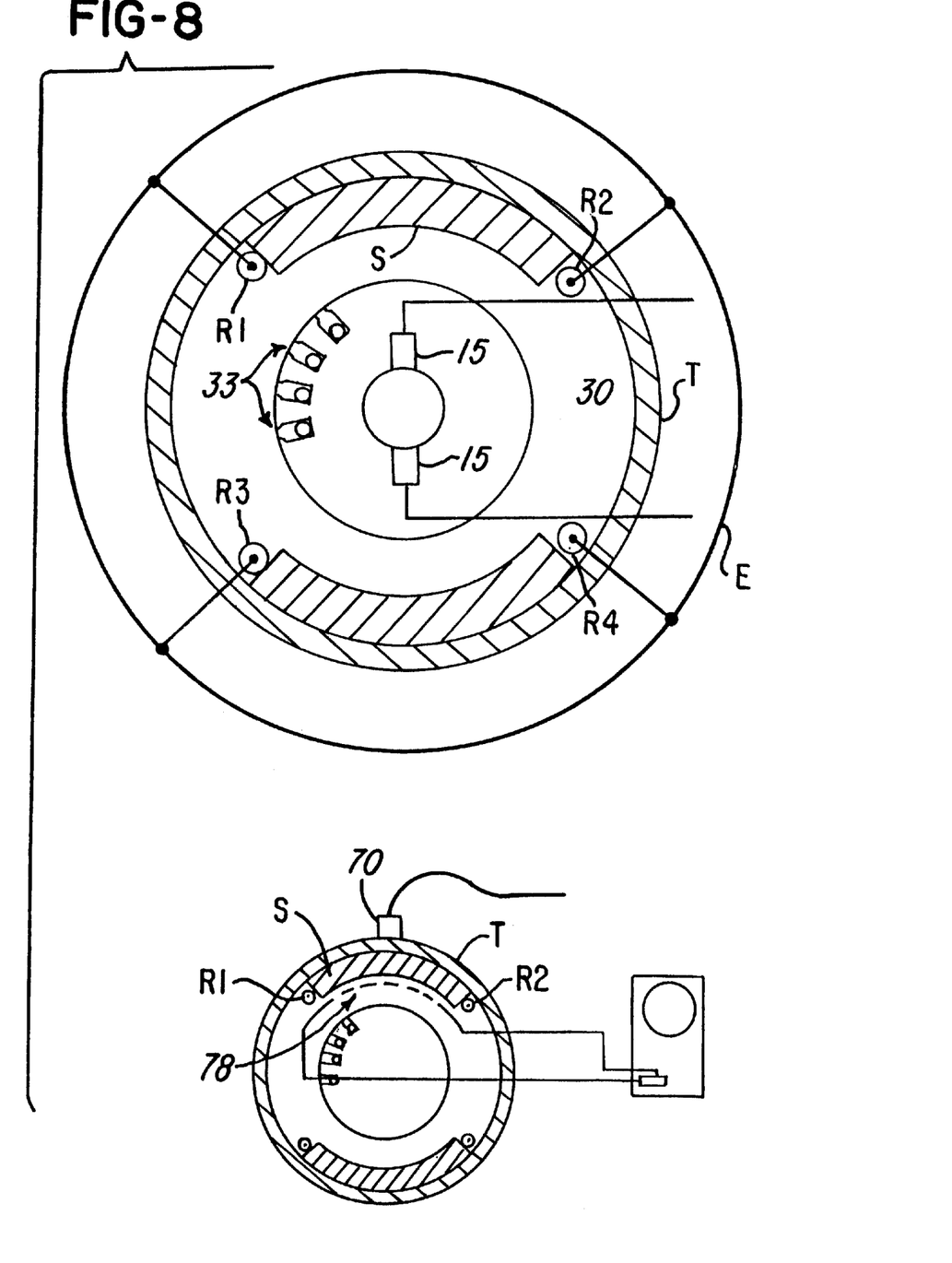
FIG. 8 illustrates another form of the invention.
Figure 9:
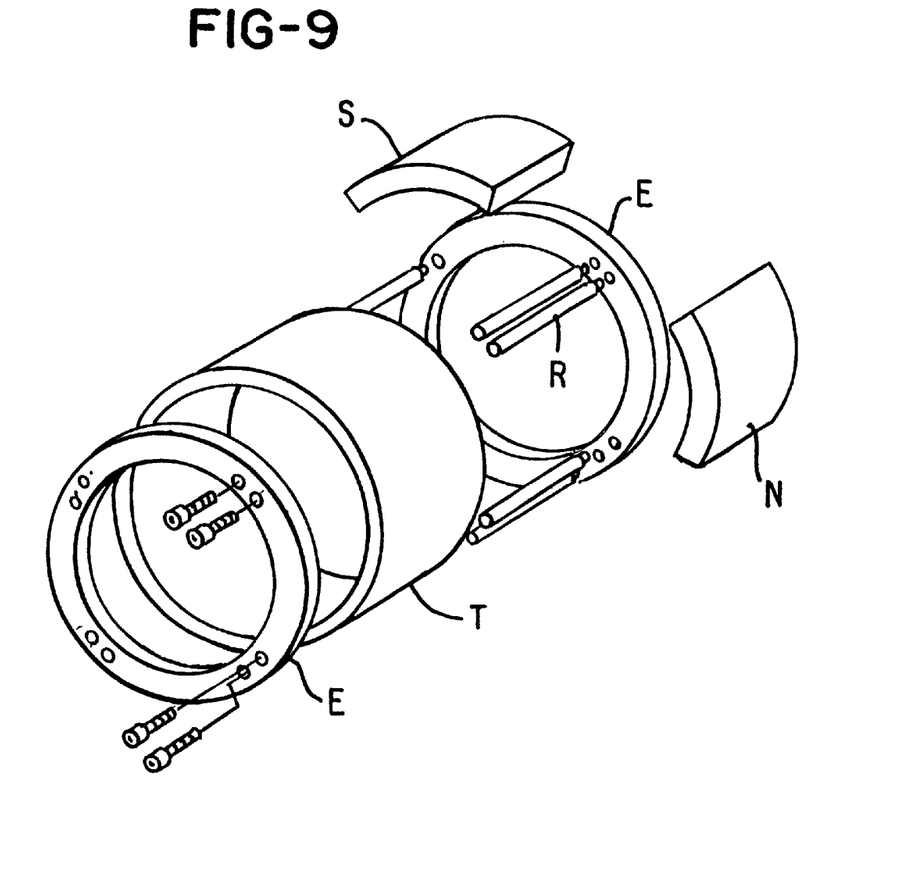
FIG. 9 illustrates a perspective view of part of the apparatus of FIG. 8.

FIG. 8 illustrates apparatus used in a test undertaken by the Inventors. The upper part of the Figure is a diagram of electrical continuity. Corresponding parts, similarly labeled, are shown in FIG. 9. The combination of the rods R in FIGS. 8 and 9, together with end plates E, form the conductive ring of FIG. 6.

Specifically, in FIG. 8, rods R1, R2, and the end plates E (not shown in FIG. 8, but visible in FIG. 9) form a ring analogous to ring 50 in FIG. 6. Also, in FIG. 8, rods R3, R4, and the end plate E (not shown in FIG. 8, but visible in FIG. 9) form a ring analogous to ring 53 in FIG. 6. The two coils, analogous to coils 50 and 53 in FIG. 6, are held at a common DC potential, by virtue of the connection through end plate E, indicated as a thin hoop in FIG. 8.

In the test, an accelerometer 70, shown at the bottom of FIG. 8, was attached to a casing T to which magnet pole S was attached. A search coil 78, was used to detect induced voltage in the ring comprised of R1, R2 and the two end plates E, shown in FIG. 9. The search coil 78 infers flux changes in the magnetic field passing between rods R1 and R2 in FIG. 8.

FIG. 9 illustrates an exploded perspective view of part of the apparatus of FIG. 8.

Figure 10:
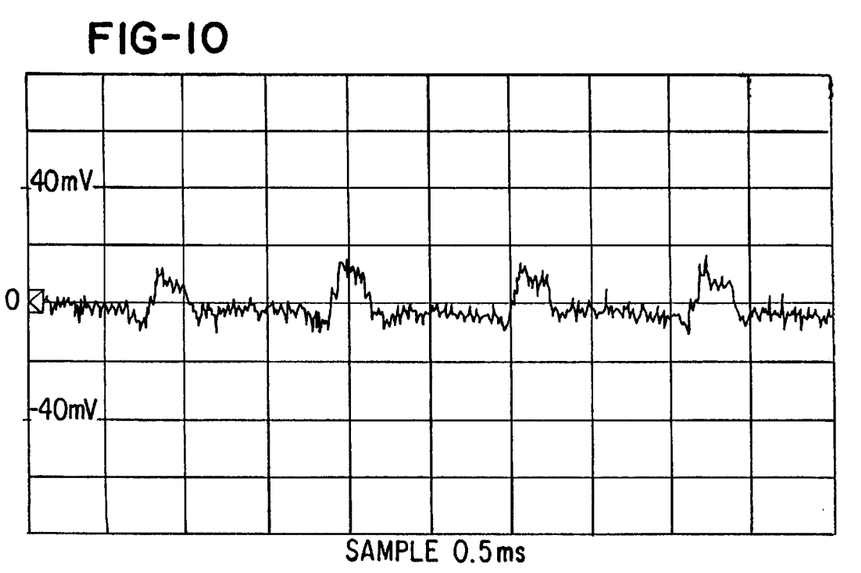
FIG. 10 is a plot of search coil voltage versus time, when the motor of FIG. 8 was run at no load, with rings 50 and 53 effectively absent.
Figure 11:
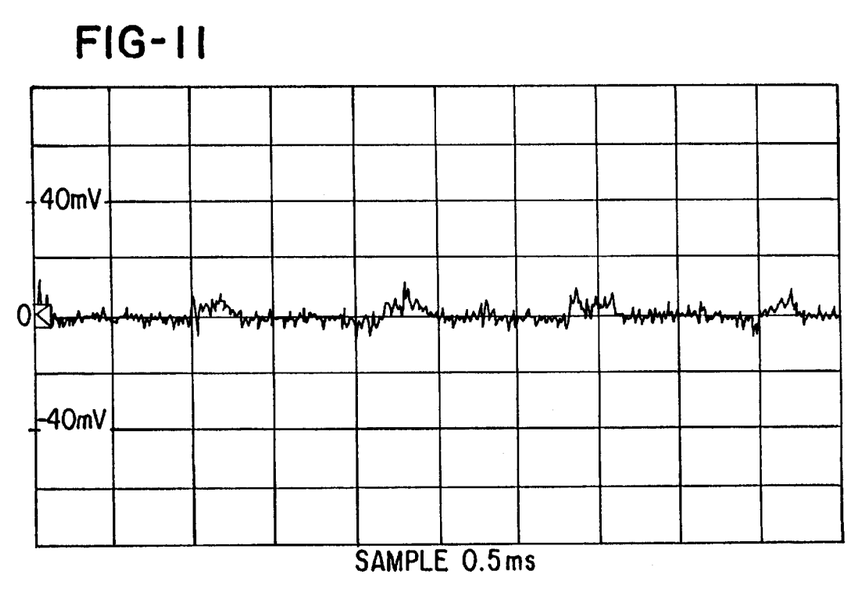
FIG. 11 is a plot of search coil voltage versus time, when the motor of FIG. 8 was run at no load, with rings 50 and 53 in FIG. 6 present.

FIG. 10 is a plot of search coil voltage versus time, when the motor of FIG. 8 was run at no load, with no dampers present (the coils 50 and 53 were open-circuited, or, from another viewpoint, each ring was split open). FIG. 11 is a plot of search coil voltage versus time, when the motor of FIG. 8 was run at no load, with rings 50 and 53 in FIG. 6 present, as indicated in FIG. 8 (the rings 50 and 53 were not split, but present in ring-form).

The difference in the two plots indicates that the rings, or dampers, reduced the search coil voltage, thereby supporting the inference that flux changes through the rings 50 and 53 were reduced by the rings.

Figure 12:
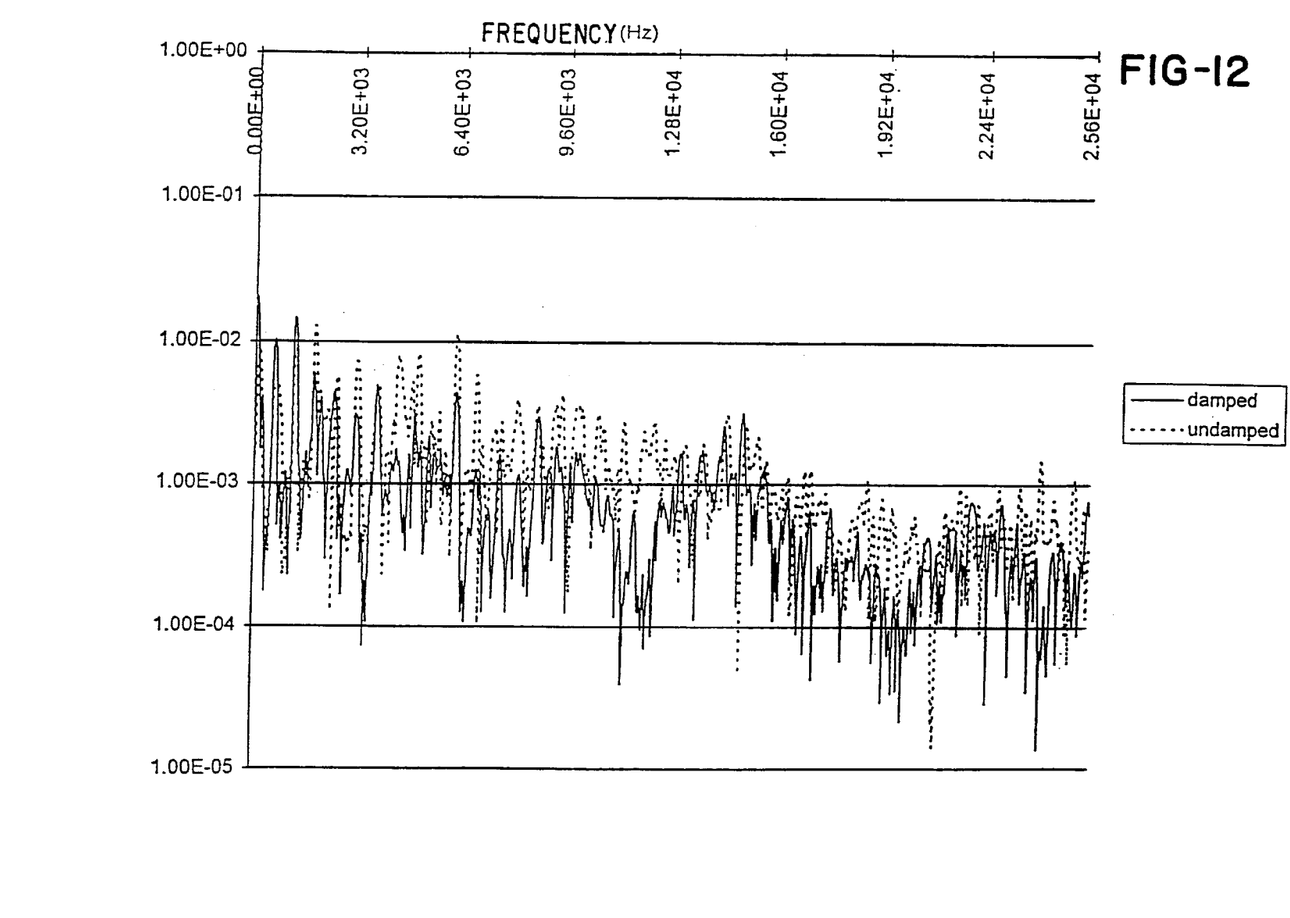
FIG. 12 illustrates a plot of accelerometer output versus frequency.

FIG. 12 illustrates a plot of accelerometer output versus frequency. The solid line indicates the damped case, and is, in general, smaller in amplitude at most frequencies than the dashed line, which indicates the undamped case. FIG. 12 supports the inference that the damping rings 50 and 53 in FIG. 6 reduce vibration of the motor.

Figure 13:
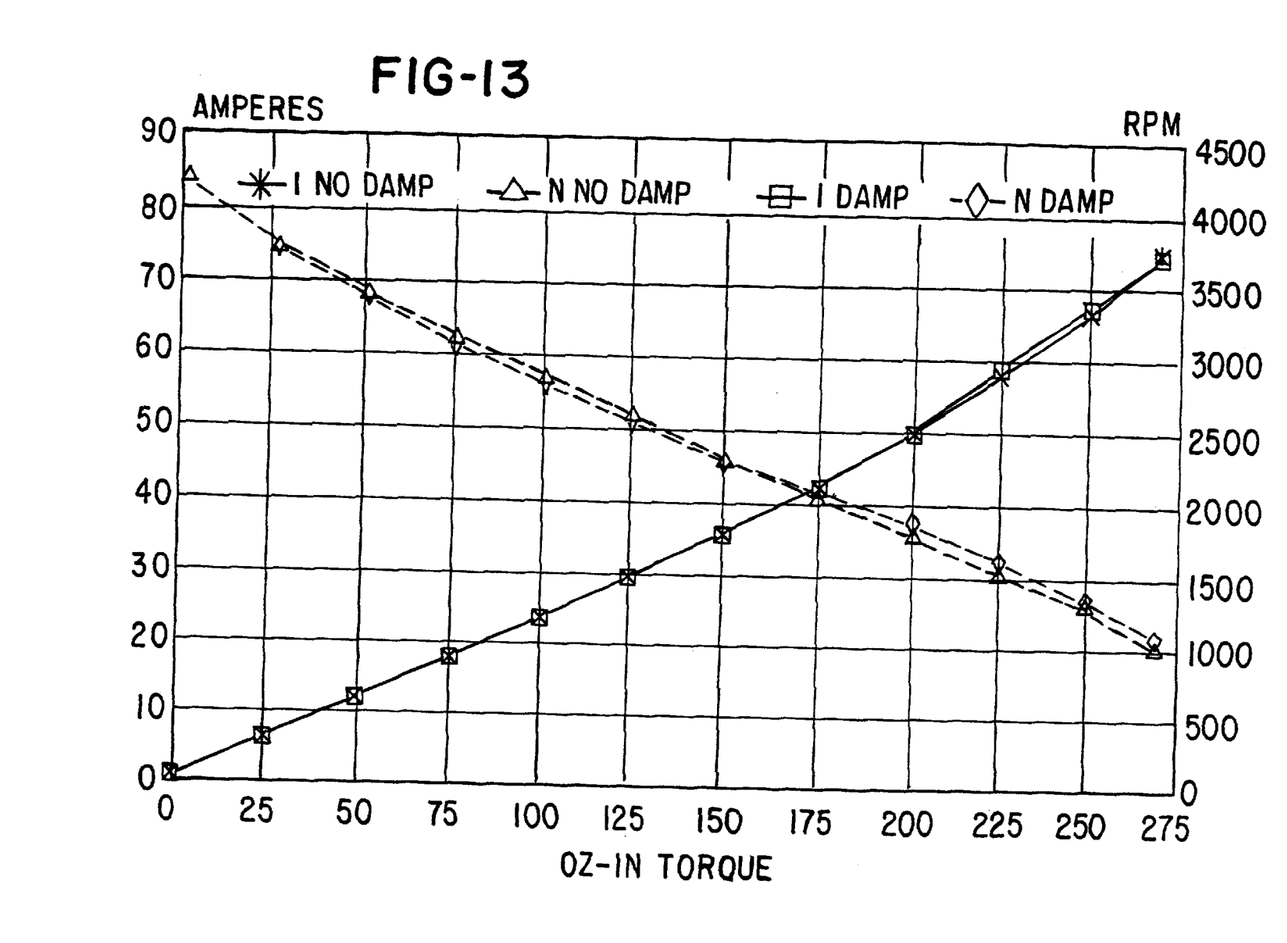
FIG. 13 is a plot of motor performance, with rings present, and with rings absent.

FIG. 13 indicates that the presence of the dampers does not significantly affect motor performance.

It should be observed that the magnets N and S in FIG. 6 need not be permanent magnets, but can take the form of electromagnets.

It should be appreciated that the rings 50 and 53 are electrically independent of the motor, with the exception of the current 65, shown in FIG. 7A, which is induced. That is, neither stator nor rotor current passes through the rings 50 and 53.

Notice that one effect of ring 50 in FIG. 6 can be characterized as reducing interaction between (a) the time changing flux 59 in FIG. 7 and (b) the magnet pole S in FIG. 6, by virtue of reducing the magnitude of changes in the flux which reach the pole S.

As FIG. 9 indicates, the components used to construct the rings can also be used as part of the motor's structural housing. For example, rods R may provide support for end rings E.

In FIG. 9, the end rings E are electrically part of the rings of the type shown in FIG. 6. However, in FIG. 9, the end rings E are not part of the case structure, which includes tube T, although they could be so constructed.

Numerous substitutions and modifications can be undertaken without departing from the true spirit and scope of the invention. What is desired to be secured by Letters Patent is the invention as defined in the following claims.

What is claimed is:

1. In an electric motor, in which a rotating magnetic flux causes vibration in another component, the improvement comprising:
   a) a conductive ring, near the component, in which rotating flux induces a time-varying current.

2. Apparatus according to claim 1, in which the rotating flux induces the ring to generate a second flux.

3. Motor according to claim 2, in which a DC current applied to the motor causes rotation of a rotor.

4. Apparatus according to claim 1, in which said means for reducing utilizes Lentz's Law to reduce flux changes which reach said component.

5. Motor according to claim 1, and further comprising:
   b) a second component with which the flux interacts; and
   c) a second conductive ring, near the second component, in which rotating flux induces a time-varying current.

6. Motor according to claim 5, in which the first and second conductive rings are electrically isolated from each other.

7. Motor according to claim 5, in which the first and second conductive rings are electrically connected.

8. Motor according to claim 1, in which the conductive ring causes a reduction in vibration of the motor during operation.

9. Motor according to claim 1, in which a DC current applied to the motor causes rotation of a rotor.

10. Motor according to claim 1, in which a rotor carries a means which generates said magnetic flux, and rotates with respect to said conductive ring.

11. Motor according to claim 1, in which a rotor carries a means which generates said magnetic flux, and rotates with respect to said conductive ring.

12. In an electric motor, in which a rotating magnetic flux interacts with a component of the motor and causes vibration, the improvement comprising:
   a) maintaining a conductive loop near said component, through which said flux passes; and
   b) generating a current in said loop, when a change in said flux occurs, which generates a second flux, which opposes the change in the flux.

13. Motor according to claim 12, in which a DC current applied to the motor causes rotation of a rotor.

14. Motor according to claim 12, in which a rotor carries a means which generates said magnetic flux, and rotates with respect to said conductive ring.

* * * * *